(12) United States Patent
Boutami et al.

(10) Patent No.: US 8,933,389 B2
(45) Date of Patent: Jan. 13, 2015

(54) OPTICAL FILTER SUITABLE FOR DEALING WITH A RADIATION OF VARIABLE INCIDENCE AND DETECTOR INCLUDING SAID FILTER

(75) Inventors: Salim Boutami, Grenoble (FR); Yohan Desieres, Lans en Vercors (FR); Laurent Frey, Fontaine (FR); Gilles Grand, Grenoble (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 623 days.

(21) Appl. No.: 13/093,084

(22) Filed: Apr. 25, 2011

(65) Prior Publication Data
US 2011/0290982 A1 Dec. 1, 2011

(30) Foreign Application Priority Data
May 27, 2010 (FR) ...................................... 10 54059

(51) Int. Cl.
*H01J 5/16* (2006.01)
*G02B 1/10* (2006.01)
(Continued)

(52) U.S. Cl.
CPC ................ *G02B 5/288* (2013.01); *G02B 5/201* (2013.01); *G02B 5/289* (2013.01)
USPC ........................... 250/226; 250/216; 359/587

(58) Field of Classification Search
CPC ........ G02B 5/288; G02B 5/289; G02B 5/201; G02B 5/28; G02B 5/284; G02B 5/285; H01L 31/0232; H01L 27/14621; G01J 1/04; G01J 3/51; G01J 3/513; G01J 2003/516; G01J 3/36

USPC ................ 250/216, 239, 226, 208.1, 227.11, 250/227.18, 227.23; 359/247, 566, 585, 359/586, 587, 588, 589, 590, 358, 359; 257/431, 432, 436, 440, 443, 257, 258; 348/272, 273, 276, 277, 278–280
See application file for complete search history.

(56) References Cited

U.S. PATENT DOCUMENTS

| 5,170,290 | A  | * | 12/1992 | Land et al. .................... 359/579 |
| 6,031,653 | A  |   | 2/2000  | Wang |
| 6,768,555 | B2 | * | 7/2004  | Chen et al. .................... 356/519 |

(Continued)

FOREIGN PATENT DOCUMENTS

| DE | 31 48 427 A1 | 6/1983 |
| EP | 0 271 165 A2 | 6/1988 |

(Continued)

OTHER PUBLICATIONS

Peter B. Catrysse et al., "Optical Efficiency of Image Sensor Pixels," J. Opt. Society of America, vol. 19, No. 8, Aug. 2002, pp. 1610-1620.

*Primary Examiner* — Que T Le
*Assistant Examiner* — Jennifer Bennett
(74) *Attorney, Agent, or Firm* — Burr & Brown, PLLC

(57) ABSTRACT

An optical filter for filtering an electromagnetic radiation of variable angle of incidence, includes a stack of at least one dielectric or semi-conductor layer arranged between two partially reflective layers, said stack defining a set of Fabry-Pérot cavities set to a predetermined wavelength. The average refractive index of the dielectric or semi-conductor layer is variable in a plane orthogonal to the direction of the stack so as to compensate the effects of the variation in the angle of incidence of the electromagnetic radiation on the transmission spectrum of the cavities.

15 Claims, 3 Drawing Sheets

(51) Int. Cl.
*G02B 5/28* (2006.01)
*G02B 5/20* (2006.01)

(56) References Cited

U.S. PATENT DOCUMENTS

| 6,798,553 | B1 * | 9/2004 | Scobey et al. ............... 359/260 |
| 6,909,554 | B2 * | 6/2005 | Liu et al. .................... 359/626 |
| 7,426,040 | B2 * | 9/2008 | Kim et al. .................... 356/519 |

| 2004/0057116 | A1 | 3/2004 | Ogawa |
| 2007/0236757 | A1 * | 10/2007 | Stewart et al. ............... 358/509 |
| 2009/0067774 | A1 * | 3/2009 | Magnusson .................... 385/10 |
| 2010/0141612 | A1 * | 6/2010 | Desieres et al. .............. 345/204 |

FOREIGN PATENT DOCUMENTS

| EP | 1 592 067 A1 | 11/2005 |
| EP | 1 630 532 A1 | 3/2006 |
| JP | 57-179807 A1 | 11/1982 |

* cited by examiner

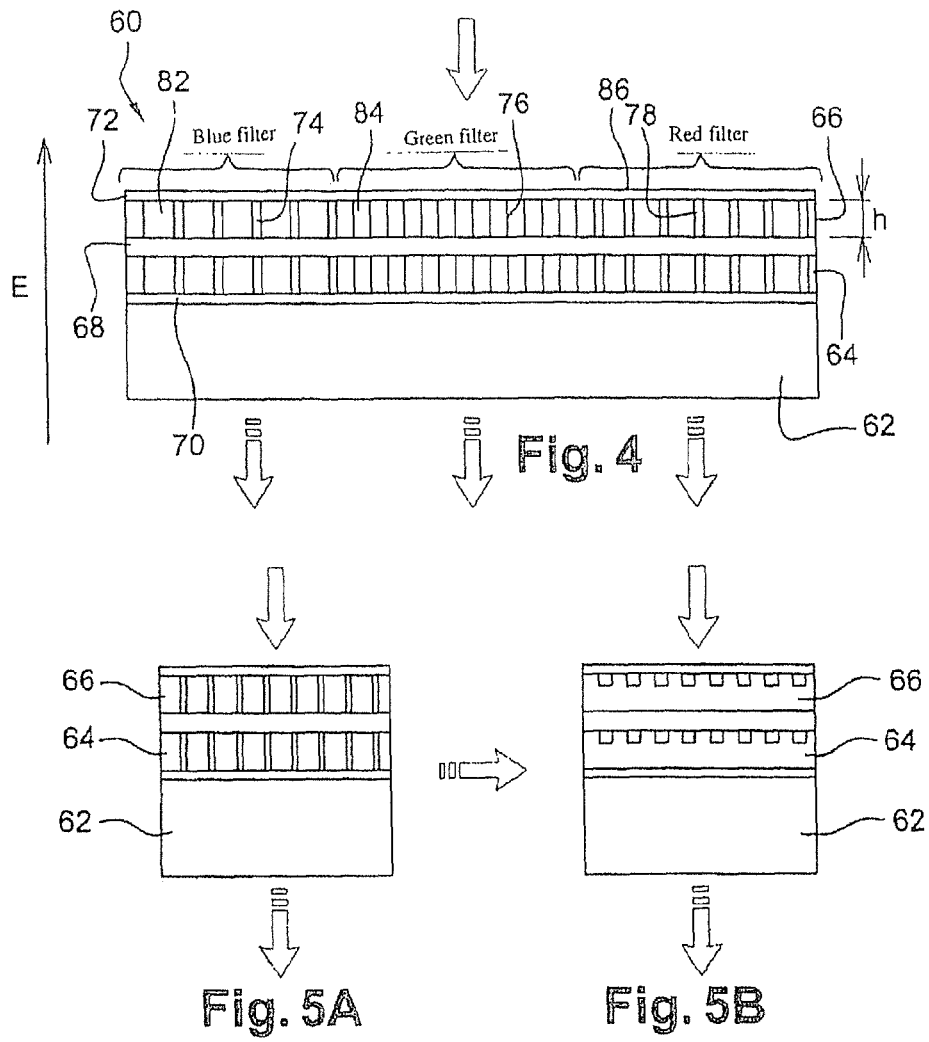
Fig. 4
Fig. 5A    Fig. 5B
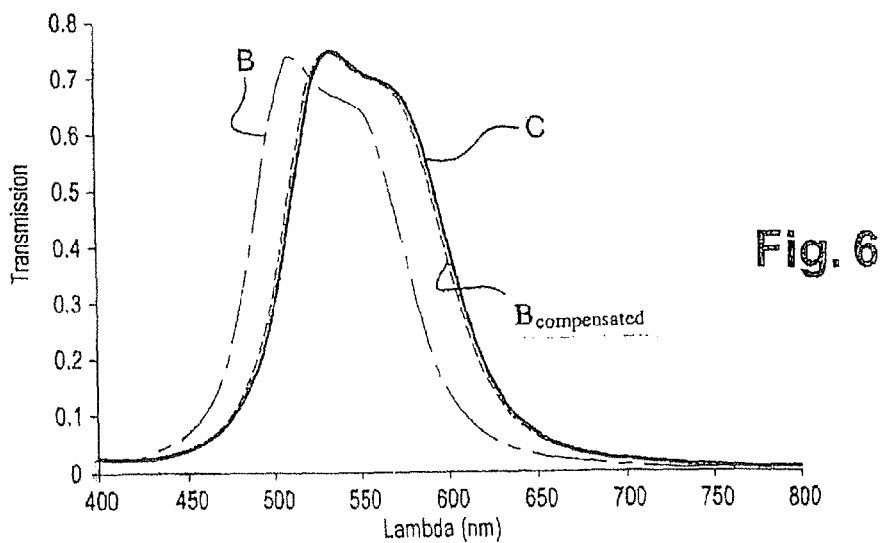
Fig. 6

OPTICAL FILTER SUITABLE FOR DEALING WITH A RADIATION OF VARIABLE INCIDENCE AND DETECTOR INCLUDING SAID FILTER

BACKGROUND OF THE INVENTION

1. Field of the Invention

This invention relates to the field of optical filters based on Fabry-Pérot cavities and characterized by a large filtering surface. It is used particularly in the field of optical filter arrays, and in particular RGB filters for use in visible imaging systems.

2. Description of Related Art

Visible imaging systems commonly comprise an array of photosites, CCD or CMOS for example, sensitive in a wide range of visible radiation, and, in particular, sensitive at the same time to red, blue and green wavelengths. As is known per se, each photosite is then specialized in the detection of one of these wavelengths by superposing an array of red, green and blue filters distributed in a Bayer array.

The best known filter arrays are composed of colored resins deposited on the photosite array. Colored resin-based filter arrays of this type are however sensitive to the angle of incidence of the light, a wide angle of incidence bringing about a more substantial propagation length in the resin.

Furthermore, with colored resins, it is difficult to access very small pixel sizes, i.e. a size of less than one micrometer, on the one hand because it may be difficult to reduce the thickness of the resins owing to their limited pigment density, which causes cross-talk between the pixels, and on the other hand because of the transition zones between adjacent pixels which are of not inconsiderable dimensions, because of the not fully accurate successive deposition of the resins associated with the different colors (the side slope is not preserved as the depositions are made).

Furthermore, as is known per se, visible imaging systems are commonly provided with an infrared filter placed in front of the photosite array. Indeed, CCD technology photosites, and even more those based on CMOS technology, have very high sensitivity in the infrared, which is detrimental to the quality of the detection in visible light if no measures are taken.

In fact, an infrared filter is sensitive to the angle of incidence of the radiation. In particular, its filter cut-off shifts as the angle of incidence increases (i.e. moves away from the normal incidence), undergoing a shift towards blue. Thus, for wide angles of incidence, a useful part of the visible spectrum is cut off, particularly in the red. It is therefore the infrared resin-filter association which is quite sensitive to the angle of incidence.

Filter arrays based on Fabry-Pérot cavities have been designed to provide colored and infrared filtering simultaneously. These arrays conventionally include a plurality of metal layers separated by one or more dielectric layers, the refractive index and thickness thereof being selected to set the wavelength of the Fabry-Pérot cavities. The dielectric layers are conventionally composed of a single material so that the refractive index thereof is constant over the whole array. Thus, to obtain Fabry-Pérot cavities set to different wavelengths, but juxtaposed relative to each other, in a Bayer array for example, an array is then produced with one or more dielectric layers of variable thickness, the thickness being used to set the wavelength of the cavities. Reference may be made for example to the document U.S. Pat. No. 6,031,653 for further details about arrays of Fabry-Pérot cavities of this type. With these metal-dielectric filters, the infrared filter is no longer necessary since the infrared is cut by the metal.

This solution addresses the problem of filter thickness which is reduced by roughly a factor of 2, but does not significantly improve the dependence of the spectral responses with the angle of incidence, nor the problem of the transition zones between pixels inherent in the non-planarity of the filters.

Manufacturing an array of Fabry-Pérot cavities of variable thickness is moreover quite restricting in terms of industrial process since it requires a great many masking and engraving steps which considerably extend the manufacturing time and reduce the final cost gain of the array achieved by eliminating the infrared filter. Furthermore, array planarization is generally required since its surface is subsequently used to form micro-lenses. An additional thickness is therefore added to the stack of Fabry-Pérot cavities, the effect of which is to increase the cross-talk effect which is directly related to the thickness of the materials passed through to reach the photosites, even if it remains below the levels encountered with resin filters.

Document EP 1 592 067 proposes, in the embodiment shown in FIGS. 13A to 13E, an array of Fabry-Pérot cavities of constant thickness. Rather than using the thickness of the dielectric layer or layers to set the wavelength of the cavities, this document proposes using their refractive index.

FIG. 1, which re-uses FIG. 13D in this document, is a cross-section view of an array 10 of Fabry-Pérot cavities, showing three juxtaposed Fabry-Pérot cavities forming a blue transmission filter 12, a red transmission filter 14 and a green transmission filter 16 respectively.

The array 10 comprises:
an insulating substrate 20;
a first alternation 22 of dielectric layers of $SiO_2$ and $TiO_2$, deposited on the substrate 20 and forming a semi-reflective surface;
a dielectric layer 24 of variable refractive index
a second alternation 26 of dielectric layers of $SiO_2$ and $TiO_2$, deposited on the dielectric layer 24 and forming a semi-reflective surface.

The dielectric layer 24 is formed of three distinct zones of different average refractive index, namely a first zone 28 composed of $TiO_2$, a second zone 30 composed of $SiO_2$, and a third zone 32 formed between the first and second zones 28, 30 and composed of a periodic network of bands of $TiO_2$ implemented in a layer of $SiO_2$. The $TiO_2$ represents ⅕ of the volume of the third zone 32, and therefore the $SiO_2$ represents ⅘ of this volume, so that the average refractive index of the zone 32 is equal to $$\sqrt{\frac{1}{5} \times n_{TiO_2}^2 + \frac{4}{5} \times n_{SiO_2}^2}.$$

This structure thus forms three juxtaposed Fabry-Pérot cavities, set to a blue, red and green wavelength respectively.

However, the wavelength at which a resonance is obtained in a Fabry-Pérot cavity, and therefore the desired effect, namely a narrow transmission bandwidth around the wavelength, depends not only on the refractive index and on the thickness of the dielectric layer, but also on the angle of incidence of the electromagnetic radiation on the cavity.

In fact, cases of radiation with a constant angle of incidence on the entire surface of the array of Fabry-Pérot cavities are very rare.

In particular, in the field of imaging, the photosite array on which the array of cavities is superposed is always placed in the focal plane of an optic in order to form an image of the scene observed on the sensor. This type of detector is shown in FIG. 2. FIG. 2 shows diagrammatically a detector 40, such as a camera for example, comprising an optic 42, of optical axis OX, and a plane sensor 44. The sensor 44 includes a detector circuit 46 that has a photosite array placed in the focal plane of the optic 42, and an array 48 of Fabry-Pérot cavities superposed on the detector circuit 46 and similar to the one in document EP 1 592 067.

As is known per se, the optic 42 forms a substantially spherical image of the scene. A spherical wave front 50 is here shown out-sized in FIG. 2 to illustrate the problem of the variation in the angle of incidence of the radiation incident on the array 48. It is thus remarkable that this radiation has a normal incidence on the array 48 on the optical axis OX and a non-normal incidence elsewhere. So for example, it is not uncommon in respect of the sizes of prior art sensors 44 that the angle of incidence $\theta_L$ at the edge of the array 48 is equal to 20°, the angle of incidence being identified relative to the norm at the plane of the array 48.

FIG. 3 shows the influence of the angle of incidence on the position in the spectrum of the transmission bandwidth of a Fabry-Pérot cavity. The "C" transmission response is for example that of the cavity 52 placed on the optical axis OX and the "B" transmission response is for example that of the cavity 54 placed at the edge of the array 48, shown in FIG. 2, the two cavities 52 and 54 being identical and set to a green wavelength. The cavity 52 on the optical axis OX receives a radiation of normal incidence whereas the cavity at the edge of the array 48 receives a radiation of angle of incidence equal to 20°.

As may be noted, there is a substantial shift between these two transmission responses, the "B" response being furthermore close to blue whereas the C response corresponds to a green wavelength. There is therefore a great variability in the selected wavelengths depending on the position of the cavities in the array 48. The image detected by the detector circuit 46 is not therefore faithful to the actual colors of the scene observed.

SUMMARY OF THE INVENTION

The purpose of this present invention is to resolve the aforementioned problem by proposing a filter comprising Fabry-Pérot cavities of constant thickness whereof the transmission response is insensitive to the variation in the angle of incidence of a predetermined electromagnetic radiation.

To this end, the object of the present invention is an optical filter for filtering an electromagnetic radiation of variable angle of incidence, including a stack of at least one dielectric or semi-conductor layer arranged between two partially reflective layers, the stack defining at least one set of Fabry-Pérot cavities set to a predetermined wavelength.

According to the present invention, the average refractive index of the dielectric or semi-conductor layer is variable in a plane orthogonal to the direction of the stack so as to compensate the effects of the variation in the angle of incidence of the electromagnetic radiation on the transmission spectrum of the cavities.

Put another way, solely by means of the refractive index, it is possible to set the Fabry-Pérot cavities so that they have substantially the same transmission profile whatever their position in the filter.

According to one embodiment of the present invention, particularly adapted to radiation with a substantially spherical wave front, the average refractive index of a cavity receiving a radiation of angle of incidence θ substantially satisfies the relation $$n = \frac{n_{pixel\_centre}}{\cos(\theta)},$$

where n is the average index of the cavity, and $n_{pixel\_centre}$ is the average index of a cavity intended to receive a radiation under normal incidence.

According to one embodiment of the present invention, the Fabry-Pérot cavities comprise at least two materials, the indices and proportions of the materials in each of the cavities being selected as a function of the angle of incidence of the radiation on the cavity, in order to set the cavity to the predetermined setting wavelength. To be more specific, each of the cavities are composed of two materials, one material taking the form of periodic patterns formed in the other material, the fill factor of the patterns setting the average refractive index of the cavity.

In particular, the patterns have a thickness less than or equal to that of the dielectric or semi-conductor layer, the thickness of the patterns of the cavity being selected as a function of the angle of incidence of the radiation on the cavity.

To advantage, each of the cavities are composed of two materials, one material taking the form of periodic patterns formed in the other material, the period of the patterns being selected to be less than the wavelength to which the cavity is set, in such a way that the cavity has a substantially homogenous refractive index for the wavelength. To be more specific, the period of the patterns is less than or equal to $$d = \frac{\lambda_{res} \times \cos(\theta)}{2},$$

where $\lambda_{res}$ is the wavelength to which the cavity is set, and θ is the angle of incidence of the radiation on the cavity.

According to one embodiment of the present invention, the filter comprises a stack of two identical dielectric or semi-conductor layers separated by a partially reflective central layer and arranged between two partially reflective end layers.

To be more specific, the thickness of the central layer is greater than the thickness of each of the end layers.

According to one embodiment of the present invention, the partially reflective layers are metal.

According to one embodiment of the present invention, the filter comprises three sets of Fabry-Pérot cavities, set to red, green and blue wavelengths respectively, and arranged in a Bayer array.

According to one embodiment, the Fabry-Pérot cavities are of identical thickness. The Fabry-Pérot cavities therefore retain the same thickness, which means in particular that small-sized filters can be produced, and consequently also small-sized photosites.

According to another embodiment, the Fabry-Pérot cavities are of different thicknesses, the indices and thicknesses of the cavities being selected so as to compensate the effects of the variation in the angle of incidence of the electromagnetic radiation on the transmission spectrum of the cavities.

A further object of the present invention is the use of an optical filter for filtering an electromagnetic radiation of variable angle of incidence, including a stack of at least one dielectric or semi-conductor layer arranged between two partially reflective layers, the stack defining a set of Fabry-Pérot cavities set to a predetermined wavelength and with refractive index variable in a plane orthogonal to the direction of the stack in order to compensate the effects of the variation in the angle of incidence of the electromagnetic radiation on the transmission spectrum of the Fabry-Pérot cavities.

A further object of the present invention is an electromagnetic radiation detector comprising:
an optic forming a substantially spherical image;
a plane detector circuit comprising an array of photosensitive elements and placed at the output of the optic and orthogonal to the optical axis thereof; and
a plane matrix filter comprising an array of Fabry-Pérot cavities, placed between the detector circuit and the optic and parallel to the detector circuit, with a Fabry-Pérot cavity arranged above each photosensitive element.

According to the present invention, the optical filter compensates the effects of the variation in the angle of incidence of the electromagnetic radiation on the transmission spectrum of the array of Fabry-Pérot cavities by the average refractive index of the cavities being variable, so as to adapt itself to a variable angle of incidence of the substantially spherical image formed by the optic and incident on the filter, and in particular decreasing along rays defined from the point of the filter through which the optical axis passes.

BRIEF DESCRIPTION OF THE FIGURES

The present invention will be better understood from reading the following description, provided solely by way of example, and given in relation to the appended drawings, wherein identical reference numbers denote identical or similar elements, and wherein:

FIG. 4 is a diagrammatic view in cross-section of an array of Fabry-Pérot cavities according to the present invention;

FIG. 5 is a diagrammatic view in cross-section of a variant of arrays of Fabry-Pérot cavities according to the present invention; and FIG. 6 is a pattern of transmission responses of a Fabry-Pérot cavity positioned on the optical axis of the detector and a Fabry-Pérot cavity positioned at the edge of the array with and without compensation for the angle of incidence of the radiation incident on this cavity.

DETAILED DESCRIPTION OF THE INVENTION

Figure 2:
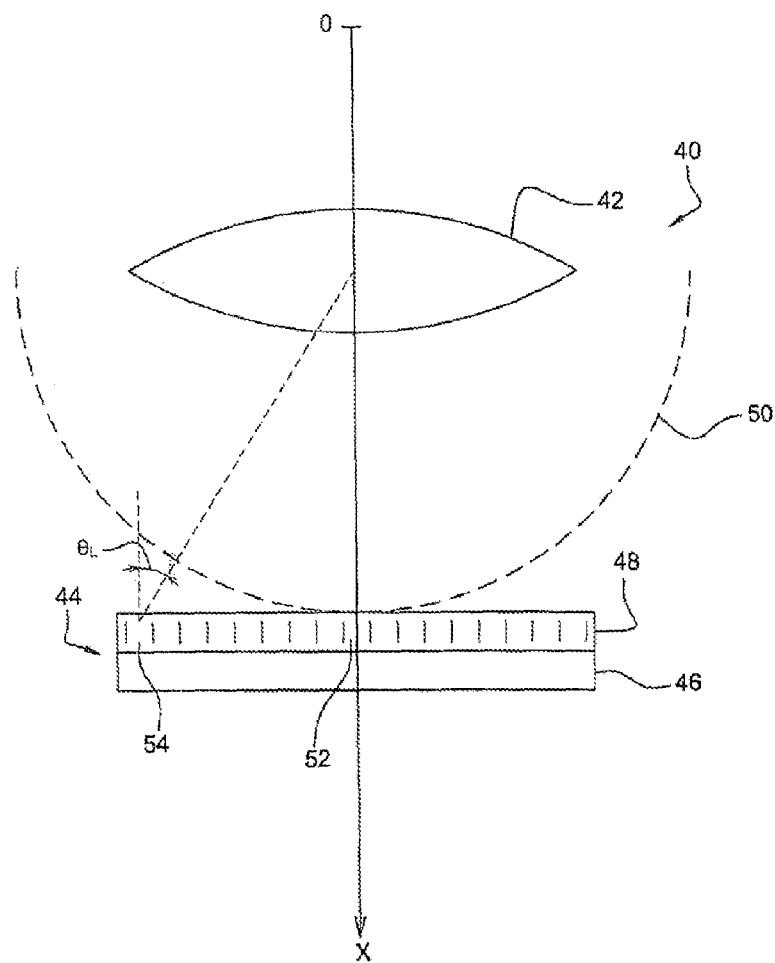
FIG. 2 is a diagrammatic view in cross-section of a detector comprising the array of cavities in FIG. 1.

FIG. 4 is a diagrammatic view in cross-section of an array 60 of Fabry-Pérot cavities, three in number in the example, forming red, green and blue filters. The array 60 is arranged for example in a detector similar to the one in FIG. 2.

The array 60 comprises an insulating substrate 62 upon which is deposited a stack of two identical dielectric or semi-conductor layers 64, 66, separated by a central metal layer 68 and placed between two metal end layers 70 and 72. The different layers are planar and stacked in a direction E.

The refractive index of the layers 64 and 66 is variable in a plane perpendicular to the direction E of the stack in order to define different filtering zones. To be more specific, the layers 64 and 66 are divided into zones 74, 76, 78 of different average refractive index. Each zone of the layers 64 and 66 is composed of two dielectric materials or two semi-conductor materials forming periodic patterns 82, 84, 86, such as parallel bands of rectangular cross-section formed in the thickness of the layers 64 and 66. The respective proportions of these materials set the average refractive index of the zone.

Each zone 74, 76, 78, combined with the metal layers 68, 70, 72, thus forms a Fabry-Pérot cavity, whereof the resonance wavelength is a function of the thickness of the cavity, of the refractive index of the zone and of the angle of incidence of the radiation on the cavity. Subsequently, no distinction will be made between the refractive index of a zone and the refractive index of the corresponding Fabry-Pérot cavity.

Figure 1:
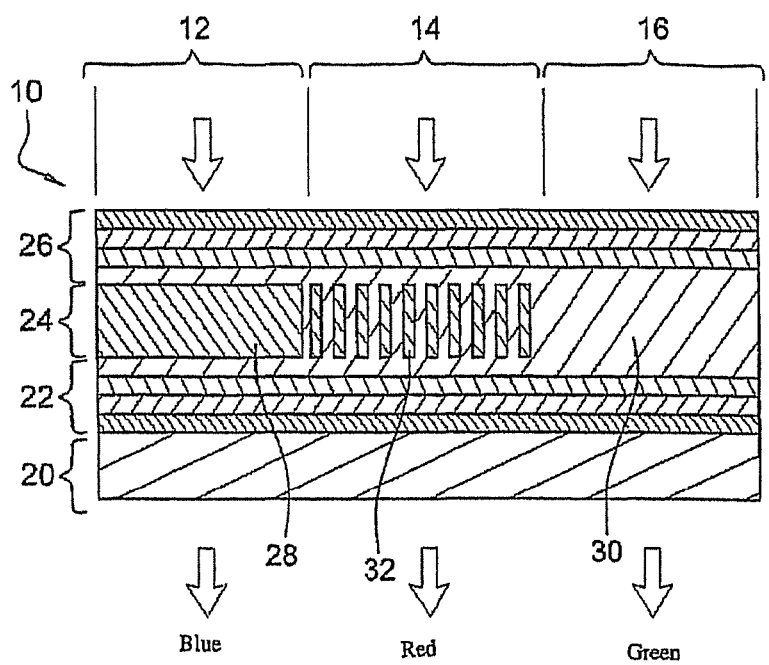
FIG. 1 is a diagrammatic view in cross-section of an array of Fabry-Pérot cavities according to the prior art.
Figure 3:
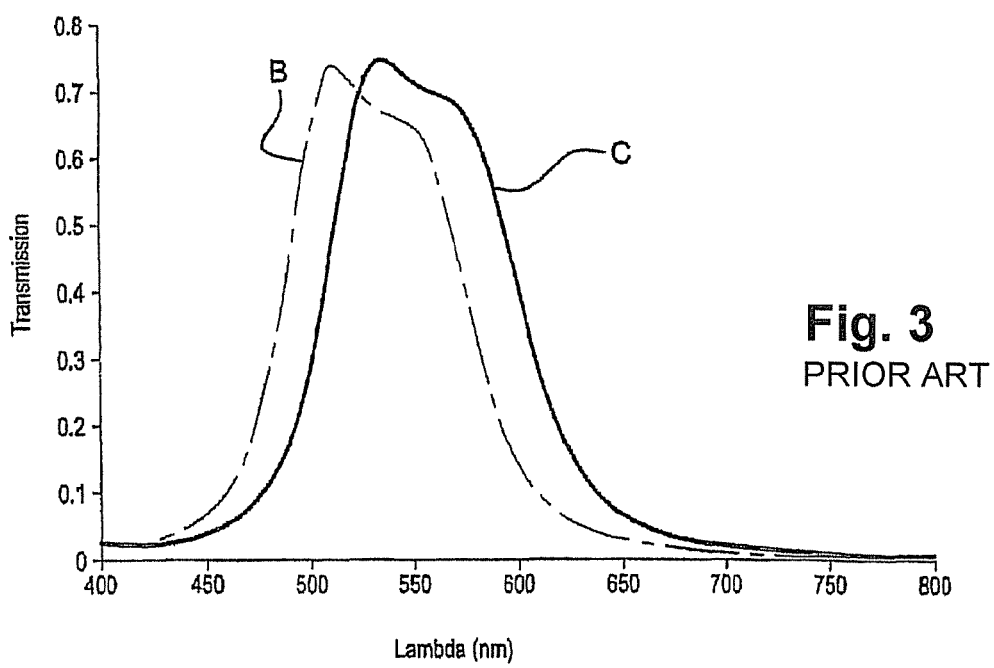
FIG. 3 is a pattern of transmission responses of a Fabry-Pérot cavity positioned on the optical axis of the detector in FIG. 2 and a Fabry-Pérot cavity positioned at the edge of the array respectively.

Although shown side by side in the example in FIG. 3, it will be understood that the red, green and blue filters formed by the Fabry-Pérot cavities may be distributed differently depending on the intended use, such as in a Bayer array, for example.

Each Fabry-Pérot cavity so formed defines an electromagnetic resonator for a wavelength $\lambda_{res}$ according to the relations:

$$\lambda_{res} = \frac{2 \times h \times n \times \cos\theta}{m - \frac{\varphi_1 + \varphi_2}{2}} \quad (1)$$

$$n = \sqrt{f \times n_b^2 + (1-f) \times n_h^2} \quad (2)$$

where:
n is the average refractive index of the cavity;
h is the thickness of the cavity, i.e. the thickness of the layers 64, 66;
θ is the average angle of incidence of the radiation on the cavity;
m is a positive integer defining the order of the cavity;
$\varphi_1$ and $\varphi_2$ are reflection phase shifts on the metal layers 68 and 72, or in an equivalent way on the layers 68 and 70;
f is the proportion of the first material, for example the one with the lowest refractive index; the number f, also termed the "fill factor", is between 0 and 1; and
$n_b$ and $n_h$ are the refractive indices of the first and second materials respectively.

For each red $\lambda_{res}^{rouge}$, blue $\lambda_{res}^{bleu}$ and green $\lambda_{res}^{vert}$ wavelength targeted, the refractive index n of the corresponding Fabry-Pérot cavities is selected so as to satisfy, independent of the location of the cavities in the array 60, the relation:

$$n \times \cos\theta = n_{pixel\_centre} \quad (3)$$

where $n_{pixel\_centre}$ is a constant number equal to the refractive index of a cavity set to the targeted wavelength and receiving a radiation of normal incidence (θ=0).

It will be noted that the relation (3) is generic to any type of Fabry-Pérot cavity, including those that include only one dielectric or semi-conductor layer.

The refractive index of a cavity is thus set simply as a function of the angle of incidence of the radiation by means of the fill factor f selected according to the relation:

$$f = \frac{n_h^2 \times \cos^2\theta - n_{pixel\_centre}^2}{(n_h^2 - n_b^2) \times \cos^2\theta} \quad (4)$$

To advantage, the period of the periodic patterns of the Fabry-Pérot cavities is very much less than the targeted wavelengths so that the cavities have a homogenous refractive index for these wavelengths.

To be more specific, the period $p_1$ of the networks of bands of the first material in the second material, or similarly the period $p_2$ of the network of bands of the second material in the first material satisfies the relation:

$$p_{1,2} \leq \frac{\lambda_{res} \times \cos(\theta)}{2} \quad (5)$$

In this way, the inventors have noted that the Fabry-Pérot cavities behave, for the targeted wavelengths, like cavities of homogenous index. Beyond the limit defined in the relation (5), if the angle of incidence remains effectively compensated, the transmission spectrum of the Fabry-Pérot cavities is degraded (i.e., drop in transmission bandwidth and appearance of multiple transmission peaks in particular) and no longer corresponds to a cavity spectrum of homogenous index.

Furthermore, however the Fabry-Pérot cavities are arranged, the refractive index of a Fabry-Pérot cavity is preferably homogenous and/or constant for the wavelength targeted for this cavity.

Preferably, the two materials constituting the layers 64 and 66 are respectively a material of high refractive index, such as for example Si, $HfO_2$, SiN, ZnS, or $TiO_2$, and a material of low refractive index, such as for example $SiO_2$, $Al_2O_3$, SiOC or materials that are nanoporous or of low density (nanoporous $SiO_2$, or nanoporous SiOC, etc.).

Preferably, the material of low refractive index is selected to fully constitute the cavities with the lowest refractive index (f=1), i.e., the cavities set to the blue wavelength and receiving a radiation of normal incidence. Likewise, the material of high refractive index is selected to fully constitute the cavities with the highest refractive index (f=0), i.e., the cavities set to the red wavelength and receiving a radiation of maximum incidence. This means that both end cavity scenarios can be considered in terms of requisite effective indices, thereby ensuring that these effective end indices are included in the range delimited by the material with the lowest index, and the one with the highest index.

The metal layers 68, 70, 72 are made for example out of Ag, Al, Au or Cu. The metal layers are advantageous in the visible field of electromagnetic radiation since they have a low transmission in the infrareds.

The central metal layer 68 has furthermore a thickness greater than that of each of the end layers 70, 72, and preferably twice as thick as the thickness of each of the layers 70, 72, which gives a transmission response comprising a single peak.

When the fill factor f is very small (or very large), the bands of first material in the second material (and the bands of second material in the first material, respectively) are very small in width, which can make them tricky to manufacture given conventional techniques of lithography and engraving.

To simplify the manufacture of periodic networks, the constituent patterns thereof are not engraved in the entire thickness of the layers 64 and 66, but partially in these layers, as can be seen in FIGS. 5A and 5B.

FIG. 5A shows a Fabry-Pérot cavity as previously described with bands made in the entire thickness direction of the layers 64 and 66 and whereof the total surface represents 15% of the surface of the cavity.

FIG. 5B shows a cavity with bands made partially in the thickness direction of the layers 64 and 66, i.e., here on half of the thickness of these layers, but having a fill factor f identical to that of the cavity in FIG. 5A. In FIG. 5B, the total surface of the bands represents 50% of the surface of the cavity. As can be noted the bands in FIG. 5B are wider and therefore more straightforward to produce, and the wavelength of the cavity remains unchanged moreover.

By way of example, the metal layers 68, 70, 72 are made of Au and have a thickness of 40 nm, 60 nm and 40 nm respectively, the layers 64 and 66 have a thickness of 80 nm are made of $TiO_2$ and $SiO_2$, with a proportion of $SiO_2$ varying from 0% (indeed, the minimum proportion of SiO2 is fixed by the red pixel receiving a maximum incidence, for which the effective index must be higher than for a normal incidence (i.e., 15%)) to 85% (f=0.85, fixed by the blue filter in normal incidence). In one embodiment in normal incidence, the Fabry-Pérot cavities have a proportion of 15% of $SiO_2$ (f=0.15) for the red wavelength, 50% (f=0.5) for the green wavelength, and 85% for the blue wavelength (f=0.85), for example.

FIG. 6 shows the effect of taking into account the angle of incidence in selecting the refractive indices of the Fabry-Pérot cavities, for the green wavelength:

the "C" curve is the transmission response of a cavity that has a proportion of $SiO_2$ equal to 50% and under radiation of normal incidence;

the "B" curve is the response of this same cavity under a radiation of incidence equal to 20°, and the "$B_{compensated}$" curve is the transmission response of a cavity that has a proportion of $SiO_2$ equal to 35% subjected to a radiation of incidence equal to 20°.

As may be noted, the "$B_{compensated}$" response is identical to the "C" response, thus showing an effective compensation of the non-normal angle of incidence.

In practice, in order to design an array of Fabry-Pérot cavities according to the present invention, the electromagnetic radiation is determined first of all in order to find out its angles of incidence on a plane corresponding to the array of cavities. For example, in the case of a visible detector, the form of the radiation coming from an optic is perfectly well known. Reference may be made for example to the document "*Optical efficiency of image sensor pixels*", Peter B. Catrysse and Brian A. Wandell, J. Opt. Soc. Am. A/Vol. 19, No. 8/August 2002, pp 1610.

Fabry-Pérot cavities have been described that are structured by a periodic network of parallel bands. Such cavities have a maximum high transmission amplitude but are sensitive to the polarization of the incident radiation.

In an alternative embodiment, these cavities are structured by two periodic networks of parallel bands with these two networks being orthogonal to each other. This makes it possible to render the cavities insensitive to the polarization of the radiation but reduces the maximum amplitude of the transmission responses of the cavities.

Likewise, Fabry-Pérot cavities have been described that are of identical thickness. It is also possible to select different thicknesses for the Fabry-Pérot cavities, with the values thereof being selected, in combination with the refractive index values, to compensate the variable angle of incidence of the radiation, relying for example on the relations (1) and (2) for the choice of thicknesses and indices.

Likewise, a use in the field of visible imaging has been described. It will be understood that this present invention also applies to other spectral ranges.

The invention claimed is:

1. An optical filter for filtering an electromagnetic radiation of variable angle of incidence, including a stack of at least one dielectric or semi-conductor layer arranged between two partially reflective layers, said stack defining a set of Fabry-Pérot cavities that are each set to a predetermined wavelength, wherein an average refractive index of the dielectric or semi-conductor layer is variable in a plane orthogonal to the direction of the stack so as to compensate for effects of a variation in an angle of incidence of the electromagnetic radiation on a transmission spectrum of each of said Fabry-Pérot cavities.

2. The optical filter as claimed in claim 1, wherein the average refractive index of a cavity receiving a radiation of angle of incidence θ substantially satisfies the relation $$n = \frac{n_{pixel\_centre}}{\cos(\theta)},$$

where n is the average index of the cavity, and $n_{pixel\_centre}$ is the average index of a cavity receiving a radiation under normal incidence.

3. The optical filter as claimed in claim 1, wherein the Fabry-Pérot cavities comprise at least two materials, the indices and proportions of the materials in each of said cavities being selected as a function of the angle of incidence of the radiation on the cavity, in order to set said cavity to the predetermined setting wavelength.

4. The optical filter as claimed in claim 3, wherein each of said cavities is composed of two materials, one material taking the form of periodic patterns formed in the other material, the fill factor of the patterns setting the average refractive index of the cavity.

5. The optical filter as claimed in claim 4, wherein the patterns have a thickness smaller than or equal to that of the dielectric or semi-conductor layer, the thickness of the patterns of the cavity being selected as a function of the angle of incidence of the radiation on the cavity.

6. The optical filter as claimed in claim 3, wherein each of said cavities is composed of two materials, one material taking the form of periodic patterns formed in the other material, the period of the patterns being selected to be smaller than the wavelength to which the cavity is set in such a way that the latter has a substantially homogenous refractive index for said wavelength.

7. The optical filter as claimed in claim 6, wherein the period of the patterns is smaller than or equal to $$d = \frac{\lambda_{res} \times \cos(\theta)}{2},$$

where $\lambda_{res}$ is the wavelength to which the cavity is set, and θ is the angle of incidence of the radiation on the cavity.

8. The optical filter as claimed in claim 1, wherein said stack comprises a stack of two identical dielectric or semi-conductor layers that are separated by a partially reflective central layer and arranged between two partially reflective end layers.

9. The optical filter as claimed in claim 8, wherein the thickness of the central layer is greater than the thickness of each of the end layers.

10. The optical filter as claimed in claim 1, wherein the partially reflective layers are metal.

11. The optical filter as claimed in claim 1, wherein said stack comprises three sets of Fabry-Pérot cavities, set to red, green and blue wavelengths respectively, that are arranged in a Bayer array.

12. The optical filter as claimed in claim 1, wherein the Fabry-Pérot cavities are of identical thickness.

13. The optical filter as claimed in claim 1, wherein the Fabry-Pérot cavities are of different thicknesses, the indices and thicknesses of the cavities being selected so as to compensate the effects of the variation in the angle of incidence of the electromagnetic radiation on the transmission spectrum of said cavities.

14. Use of an optical filter that includes a stack of at least one dielectric or semi-conductor layer arranged between two partially reflective layers, said stack defining a set of Fabry-Pérot cavities that are each set to a predetermined wavelength, said filter having a variable refractive index in a plane orthogonal to the direction of the stack, to compensate for effects of a variation in an angle of incidence of an electromagnetic radiation on a transmission spectrum of each of the Fabry-Pérot cavities.

15. An electromagnetic radiation detector comprising:
   an optic forming a substantially spherical image;
   a plane detector circuit comprising an array of photosensitive elements and placed at the output of the optic according to a plane orthogonal to the optical axis thereof; and
   a plane matrix filter, comprising an array of Fabry-Pérot cavities, placed between the detector circuit and the optic, and extending parallel to the detector circuit, each of the Fabry-Pérot cavities being arranged above each photosensitive element,
   wherein the filter is in accordance with any one of the previous claims, the average refractive index of said cavities being variable so that it can adapt to a variable angle of incidence of the substantially spherical image formed by the optic and incident on the filter.

\* \* \* \* \*